United States Patent
Atta et al.

(10) Patent No.: US 10,131,556 B1
(45) Date of Patent: Nov. 20, 2018

(54) HYDROPHOBIC NANOPARTICLE COMPOSITIONS FOR CRUDE OIL COLLECTION

(71) Applicant: KING SAUD UNIVERSITY, Riyadh (SA)

(72) Inventors: Ayman M. Atta, Riyadh (SA); Mahmood M. S. Abdullah, Riyadh (SA); Hamad A. Al-Lohedan, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/959,074

(22) Filed: Apr. 20, 2018

(51) Int. Cl.
| | |
|---|---|
| C02F 1/40 | (2006.01) |
| C08L 83/04 | (2006.01) |
| C08L 95/00 | (2006.01) |
| C02F 1/68 | (2006.01) |
| C08K 5/05 | (2006.01) |
| C08K 5/092 | (2006.01) |
| C08K 3/36 | (2006.01) |
| B82Y 30/00 | (2011.01) |
| C02F 101/32 | (2006.01) |

(52) U.S. Cl.
CPC ............ *C02F 1/681* (2013.01); *C08K 3/36* (2013.01); *C08K 5/05* (2013.01); *C08K 5/092* (2013.01); *C08L 83/04* (2013.01); *C08L 95/00* (2013.01); *B82Y 30/00* (2013.01); *C02F 2101/32* (2013.01)

(58) Field of Classification Search
CPC ...... C02F 1/681; C02F 2101/32; C08L 83/04; C08L 95/00; C08K 3/36; C08K 5/05; C08K 5/092; B82Y 30/00
See application file for complete search history.

(56) References Cited

U.S. PATENT DOCUMENTS

| | | | |
|---|---|---|---|
| 3,508,663 A | 4/1970 | Brill | |
| 3,646,120 A * | 2/1972 | Pitchford | ............ B01F 17/0021 516/72 |
| 5,035,804 A | 7/1991 | Stowe | |
| 5,316,029 A | 5/1994 | Campbell et al. | |
| 5,466,387 A | 11/1995 | Pianta et al. | |
| 7,160,379 B1 | 1/2007 | Shoshany et al. | |
| 2011/0306491 A1 | 12/2011 | Belisle | |
| 2012/0238669 A1 | 9/2012 | Bowen, III | |

(Continued)

FOREIGN PATENT DOCUMENTS

| | | | |
|---|---|---|---|
| CN | 103357196 A | | 10/2013 |
| CN | 105542221 A | * | 5/2016 |

(Continued)

OTHER PUBLICATIONS

English-language machine translation of CN 105778149 A.*

(Continued)

*Primary Examiner* — James C Goloboy
(74) *Attorney, Agent, or Firm* — Richard C. Litman

(57) ABSTRACT

Hydrophobic nanoparticle compositions include silica nanoparticles capped with asphaltene succinimide alkoxy silane (ASAS). The nanoparticles can have a particle size ranging from about 20 nm to about 10000 μm. The nanoparticle compositions can be used as a coating for raw sand to provide a super-hydrophobic sand. The nanoparticle compositions can be used as a coating for a polyurethane (PU) sponge to provide a super-hydrophobic sponge. The super-hydrophobic sand and/or super-hydrophobic sponge can be used to collect crude oil deposited in aquatic environments as a result of petroleum crude oil spills.

15 Claims, 7 Drawing Sheets

(56) References Cited

U.S. PATENT DOCUMENTS

| | | | |
|---|---|---|---|
| 2013/0264287 A1* | 10/2013 | Zhang | C02F 1/40 |
| | | | 210/639 |
| 2014/0319039 A1 | 10/2014 | Hourani | |
| 2015/0073090 A1 | 3/2015 | Siddiqui | |

FOREIGN PATENT DOCUMENTS

| | | | |
|---|---|---|---|
| CN | 105542221 A | | 5/2016 |
| CN | 105778149 A | * | 7/2016 |
| CN | 106381690 A | | 2/2017 |
| CN | 106866010 A | | 6/2017 |
| CN | 106893571 A | | 6/2017 |
| CN | 107151862 A | | 9/2017 |

OTHER PUBLICATIONS

A. M. Atta, A. O. Ezzat, A. I. Hashem, Synthesis and application of monodisperse hydrophobic magnetite nanoparticles as an oil spill collector using an ionic liquid, RSC Adv. 7 (2017) 16524-16530.

D. Deng, D. P. Prendergast, J. MacFarlane, R. Bagatin, F. Stellacci, P. M. Gschwend, Hydrophobic meshes for oil spill recovery devices, ACS Appl. Mater. Interfaces 5 (2013) 774-781.

X. Gao, X. Wang, X. Ouyang & C. Wen, Flexible Superhydrophobic and Superoleophilic MoS2 Sponge for Highly Efficient Oil-Water Separation, Scientific Reports. 6:27207 (2016) DOI 10.1038/srep27207.

X. Zhou, Z. Zhang, X. Xu, X. Men, X. Zhu, Facile fabrication of superhydrophobic sponge with selective absorption and collection of oil from water, Ind. Eng. Chem. Res. 52 (2013) 9411-9416.

X. Chen, J. A. Weibe, S. V. Garimella, Continuous oil-water separation using polydimethylsiloxane-functionalized melamine sponge, Ind. Eng. Chem. Res. 55 (2016) 3596-3602.

Y. Ding, W. Xu, Y. Yu, H. Hou, Z. Zhu, One-step preparation of highly hydrophobic and oleophilic melamine sponges via metal-ion-induced wettability transition, Appl. Mater. Interfaces, (2018) DOI: 10.1021/acsami.7b13626.

* cited by examiner

HYDROPHOBIC NANOPARTICLE COMPOSITIONS FOR CRUDE OIL COLLECTION

BACKGROUND

1. Field

The disclosure of the present patent application relates to hydrophobic nanoparticle coating compositions for surface modification of sand or polyurethane sponges, and particularly to hydrophobic nanoparticle coating compositions including silica nanoparticles coated with modified-asphaltene.

2. Description of the Related Art

Petroleum crude oil spills produced during off-shore well production or crude oil transportation pose significant risk to ecosystems and aquatic environments. Conventional methods for collecting crude oil and handling oil spills involve, for example, skimmers, booms, in situ burning, sorbents, dispersants, and biodegradation. These techniques are expensive, resource heavy and often insufficiently effective.

New techniques to collect crude oil are based on the use of hydrophobic substances. External magnets or mechanically driven skimmers capitalize on differences in density or wettability to separate oil and water, but can only recover oil near the deployment vessel. These challenges motivate development of new oil spill recovery technologies.

Thus, a modification of sand or sponge surfaces with hydrophobic silica/modified-asphaltene nanoparticles solving the aforementioned problems is desired.

SUMMARY

Hydrophobic nanoparticle compositions include silica nanoparticles capped with asphaltene succinimide alkoxy (ASAS). The capped silica nanoparticles can have a particle size ranging from about 20 nm to about 10000 μm. The nanoparticle compositions can be used as a coating for raw sand to provide a super-hydrophobic sand. The nanoparticle compositions can be used as a coating for a polyurethane (PU) sponge to provide a super-hydrophobic sponge. The super-hydrophobic sand and/or super-hydrophobic sponge can be used to collect crude oil deposited in aquatic environments as a result of petroleum crude oil spills.

The present compositions include hydrophobic or super-hydrophobic compositions having a reaction product of at least a substrate having a reacting group which reacts with an alkoxysilane combined with modified asphaltene-maleic anhydride adducts to cap raw sand or a sponge, causing the sand or sponge to be more hydrophobic. The present compositions are oleophilic or super-oleophilic, with superior recyclability, good mechanical strength, low cost, and manufacture scalability. The present compositions are compatible with sand or sponges that are also oleophilic or super-oleophilic.

These and other features of the present disclosure will become readily apparent upon further review of the following specification and drawings.

DETAILED DESCRIPTION OF THE PREFERRED EMBODIMENTS

Hydrophobic nanoparticle compositions include silica nanoparticles capped with an asphaltene succinimide alkoxysilane (ASAS), (referred to herein as "silica/ASAS nanoparticles" or "capped silica nanoparticles"). The capped silica nanoparticles can have a particle size ranging from about 20 nm to about 10000 μm. The nanoparticle compositions can be used as a coating for raw sand to provide a super-hydrophobic sand. The nanoparticle compositions can be used as a coating for a polyurethane (PU) sponge to provide a super-hydrophobic sponge. The super-hydrophobic sand and/or super-hydrophobic sponge can be used to collect crude oil deposited in aquatic environments as a result of petroleum crude oil spills, e.g., Arabic heavy crude oil spills, medium crude oil spills, and light crude oil spills. The nanoparticle compositions can provide contact angles ranging from about 145° to about 170°.

Figure 1:
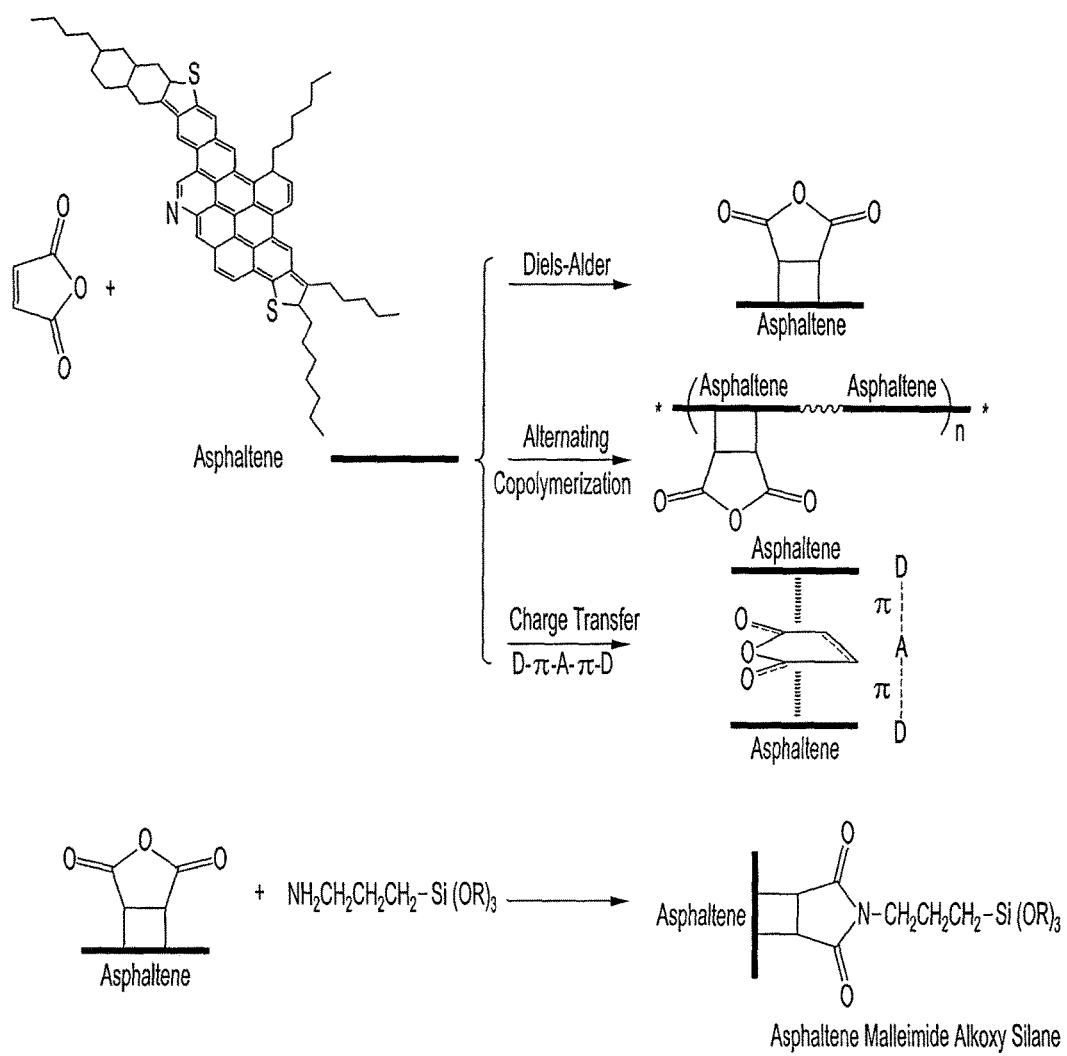
FIG. 1: Schematic of proposed synthesis of ASAS.

An exemplary reaction scheme for synthesis of ASAS is provided in FIG. 1. As shown in FIG. 1, asphaltene-maleic anhydride adducts can be reacted with aminopropyl trimethoxysilane (APMS) to provide ASAS. The chemical structure of the ASAS, as elucidated by FTIR and $^1$HNMR spectra, is presented in FIGS. 2 and 3.

The present teachings are illustrated by the following examples.

Example 1

Materials for Exemplary Experimental Methods

All materials used in the following examples demonstrating non-limiting embodiments of the present subject matter were analytical grade and purchased from Sigma-Aldrich Chemicals Co. Silicone precursors based on vinyl trimethoxy silane (VTS), tetraethoxysilane (TEOS), and γ-aminopropyltriethoxysilane (APS) were used. Unsaturated fatty acids and amines such as oleic, linoleic and linolenic acids and amines were also used to prepare hydrophobic silicone precursors. Toluene:n-heptane solvent (1:40 vol. %) was used to isolate the asphaltene fractions from crude oil. The specific silicone precursors, unsaturated fatty acids and solvents should be understood to be non-limiting examples of chemically appropriate materials for the relevant embodiments. Arabic heavy crude oil (19.2° API gravity) and medium crude oil (30.8° API gravity) were produced from Ras Gara wells by Aramco, Saudi Arabia. Sea water was collected from the Arabian Gulf Fourier transform infrared spectrometry (FTIR; Shimadzu FTIR 8000 spectrometer using KBr disc) was used to confirm the formation of SFA and ASAS precursor.

Proton Nuclear Magnetic Resonance spectroscopy ($^1$HNMR; 400 MHz Bruker Avance DRX-400 spectrometer) was used to investigate the chemical structure of SFA and ASAS using deuterated DMSO as solvent.

A drop shape analyzer (DSA-100) was used to determine the contact angles of glass coated with hydrophobic silica capsules by sessile drop method performed at room temperature.

Dynamic light scattering (DLS; Zetasizer Nano ZS, Malvern Instrument Ltd., Malvern, UK) was used to determine the hydrodynamic diameter ($H_d$) and polydispersity index (PDI) of the silica nanocapsules in n-hexane solutions at 25° C. The zeta potentials were determined in methanol dispersions.

Example 2

Preparation of Asphaltene Succinimide of γ-aminopropyltriethoxysilane (ASAS)

Asphaltene (2 g) and maleic anhydride (1.5 g) were dissolved in 50 ml of toluene in a three necked bottom flask. The mixture was refluxed for 8 h under nitrogen atmosphere, followed by removal of solvent under reduced pressure. The product of this reaction was mixed with an equimolar solution of APS and 5 ml toluene and refluxed at 165° C. for 2.5 hours. The reaction temperature was then raised to 180° C. and maintained for an additional 4 hours. Finally, the mixture was cooled to room temperature and then washed with acetone followed by water.

Example 3

Preparation of Fatty Amines of Vinyltrimethoxysilane (SFA)

Fatty amine, such as oleyl amine (0.01 mol), was added to vinyltrimethoxysilane (0.05 mol) in 80 ml tetrahydrofuran (THF) and the resulting solution was stirred at 65° C. for 4 h. The THF was removed with a rotary evaporator under pressure to obtain a fatty amine of vinyltrimethoxysilane (SFA).

Example 4

Preparation of Silica-coated ASAS Nanoparticles

Method 1 provides an exemplary method for preparing silica nanoparticles in the absence of ASAS, while Methods 2-3 provide exemplary methods for preparing silica nanoparticles in the presence of ASAS.

Method 1

Methanol (100 mL) was placed in a sonication bath. After 10 min, a known volume of TEOS (0.8 mL) and SFA (0.4 g) were added, still while sonicating. After 20 min, 28% ammonium hydroxide (24 mL) was added as a catalyst to promote condensation. Sonication was continued for a further 60 min until a white turbid suspension was achieved. All steps of method 1 were conducted at room temperature.

Method 2:

Methanol (100 mL) and a known volume of TEOS (0.8 mL) and SFA (0.4 g) were placed in a sonication bath. After 10 min, a known volume of ASAS (0.4 g) was added, while maintaining sonication. After 20 min, 28% ammonium hydroxide (24 mL) was added as a catalyst to promote condensation. Sonication was continued for a further 60 min until a white turbid suspension was achieved. All steps of method 2 were conducted at room temperature.

Method 3:

A mixture solution of n-hexane (20 mL) and TEOS (3 mL) was stirred for 10 minutes. ASAS (2 mL) were added into the n-hexane/TEOS solution dropwise for 30 min under continuous stirring. ASAS content relative to silica precursor were varied from 5 to 50 wt. %. Concentrated ammonia water (7.0 mL; 28 wt. %) was added, resulting in a clear solution. While the reaction proceeded at 35° C. under continuous stirring (200 rpm), a homogeneous milky colloidal solution gradually formed.

Figure 4A:
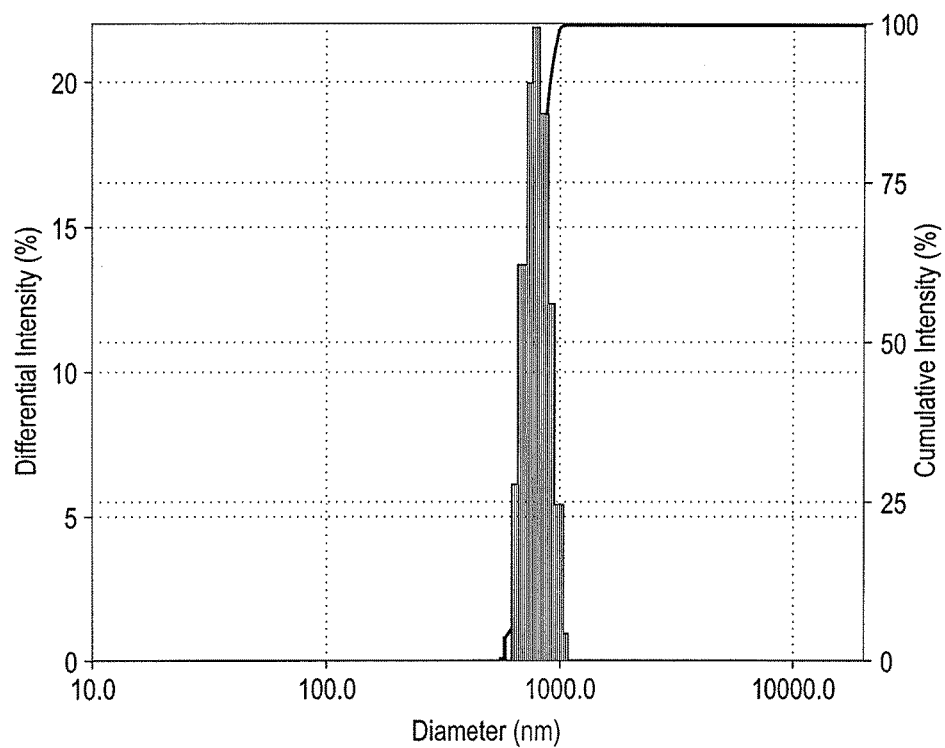
FIG. 4A: DLS data taken in n-heptane of silica nanoparticles.
Figure 4B:
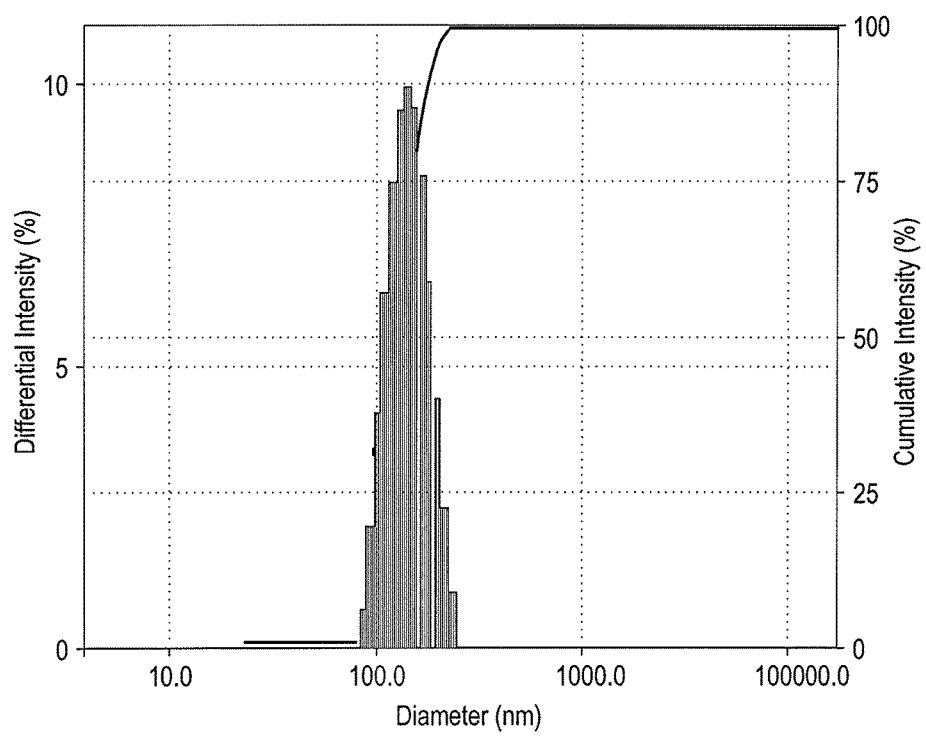
FIG. 4B: DLS data taken in n-heptane of silica/ASAS nanoparticles with ASAS prepared by method 3.
Figure 5A:
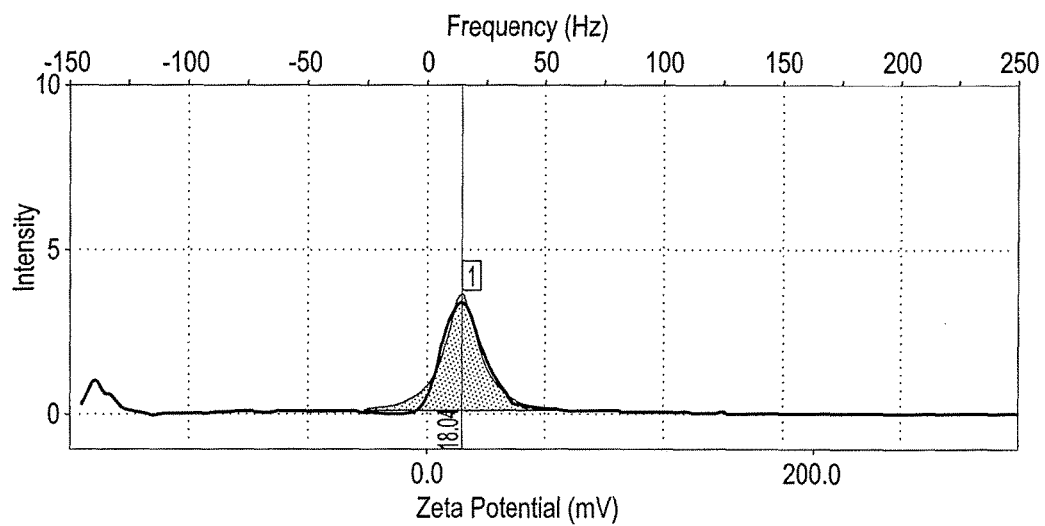
FIG. 5A: Zeta potential (my) data of ASAS.
Figure 5B:
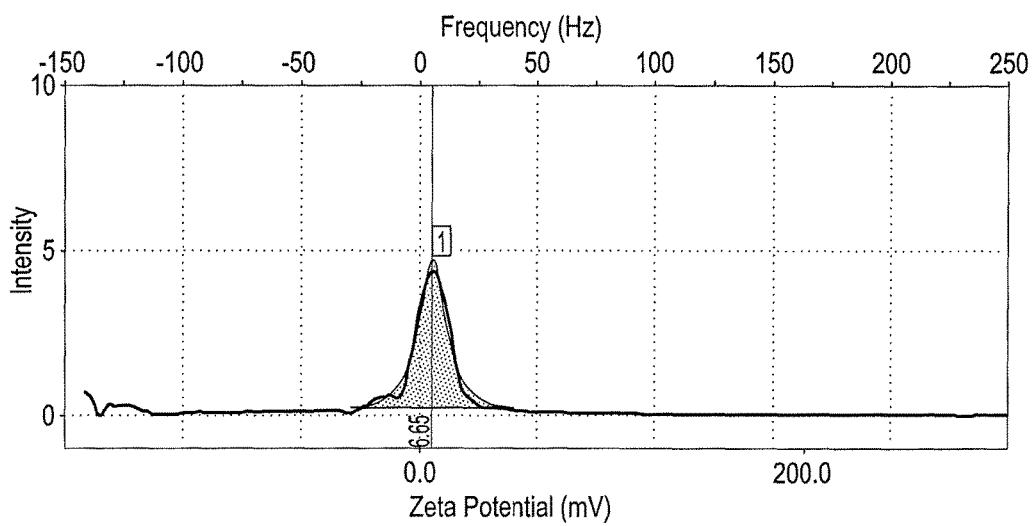
FIG. 5B: Zeta potential (mV) data of silica/ASAS nanoparticles with ASAS prepared by method 3.

Particle sizes and zeta potentials or surface charges (mV) of the hydrophobic nanoparticle compositions or hydrophobic silica/ASAS nanoparticles formed by Method 3 were determined by DLS and zeta potential measurements performed in heptane and ethanol, results of which are presented in FIGS. 5A and 5B, respectively. The particle sizes (in nm) and their polydispersity index (PDI) values are recorded in FIGS. 4A and 4B, showing silica/ASAS nanoparticles formed according to Method 3 have a monodisperse distribution, and low particle sizes of ~100 nm are obtained in hexane-water emulsion. Moreover, the particle sizes of silica nanoparticles were reduced in the presence of ASAS (FIGS. 4A-4B). It is believed that this may be due to increased hydrolysis of alkoxy groups of TEOS and ASAS in the emulsion system. Good compatibility between reactants reduces particle sizes of the nanoparticles, as can be seen in FIGS. 4A and 4B.

The surface charges of silica nanoparticles (FIG. 5B) formed in the absence of ASAS are less positive than silica nanoparticles formed in the presence of ASAS, confirming that the absence of ASAS during the synthesis of silica nanoparticles enhances the appearance of hydroxyl groups on the surface of silica, despite the presence of the succinimide group in the chemical structure of ASAS. The presence of ASAS during preparation of hydrophobic silica nanoparticles (methods 2-3) changes the surface charges of particles to positive (FIG. 5B) due to imide groups of ASAS.

Example 5

Preparation of Super-hydrophobic Sand

To prepare super-hydrophobic sand, 5 g of sand was modified with 50 ml of 0.5% hydrophobic silica prepared by Methods 1-3 in solution under continual stirring for 3 hours at room temperature. The resulting treated sand was collected after rinsing with ethanol three times and drying at 60° C. for 1 hour to provide super-hydrophobic sand. The super-hydrophobic sand was mixed with untreated sand at ratios ranging from 1:1 to 1:10 wt. %.

Example 6

Preparation of Super-hydrophobic Sponge

Super-hydrophobic and super-oleophilic polyurethane (PU) sponges were prepared by dispersion of the hydrophobic silica nanoparticle compositions (0.18 g) (prepared by Methods 1-3) and polydimethylsiloxane (PDMS; 0.05 ml) in ethanol (60 g). Then, a clean PU sponge was immersed in the above solution for approximately 30 minutes, before being removed and dried in an oven at 110° C. for 1 h. It is believed that PDMS acts as an adhesive to adhere $SiO_2$ nanoparticles to the PU sponge.

Example 7

Assessment of Super-hydrophobic Sand and Super-hydrophobic Sponge on Collection of Oil Spills About 5 mL of medium or heavy crude oil was poured onto a surface of 250 mL seawater in a 500 mL beaker. Different ratios of the hydrophobic sand and hydrophobic PU sponge relative to the crude oil contents were added (as a solid powder) to the crude oil and mixed using a glass rod for one minute. The remaining oil was extracted from the seawater surface using a chloroform solvent. The efficiency of the hydrophobic sand and hydrophobic PU sponge on the collection of oil spill was evaluated using equation (1):

$$CE(\%) = V_0/V_1 \times 100 \tag{1}$$

where $V_0$ and $V_1$ are the volumes of oil remaining in the beaker after and before oil removal, respectively.

After crude oil collection, used hydrophobic PU sponge samples were reused after pressing or squeezing the PU sponge and washing several times with chloroform and ethanol solvents.

Example 8

Characterization of ASAS

Figure 2:
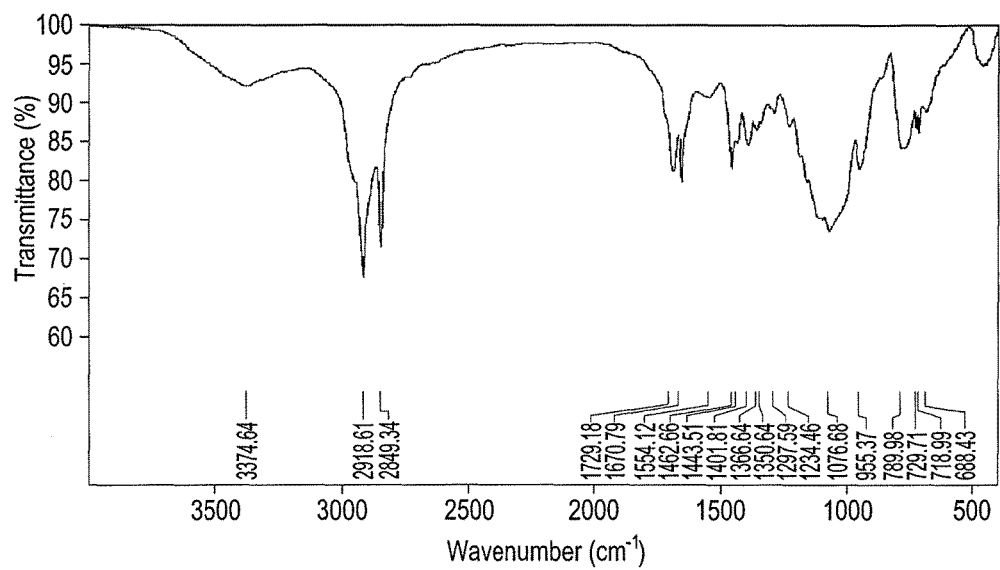
FIG. 2: FTIR spectrum of ASAS.
Figure 3:
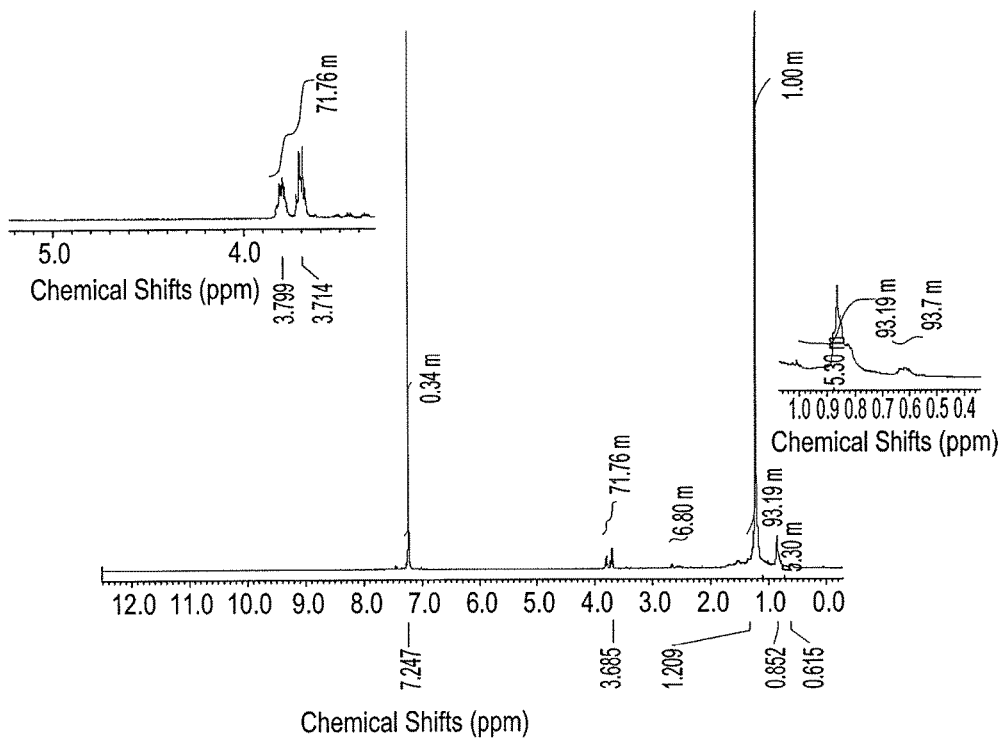
FIG. 3: $^1$HNMR spectrum of ASAS.

The chemical structure of ASAS, as elucidated by FTIR and $^1$HNMR spectra, is presented in FIGS. 2 and 3, respectively. FIG. 2 shows bands corresponding to the succinimide group at 1702 $cm^{-1}$ and 1725 $cm^{-1}$, presumably due to C=O stretching, in the spectrum of ASAS, which are not in the spectra of asphaltene or maleic anhydride. As such, these bands are consistent with succinimide substitution without ring opening of succinimide in the creation of ASAS, as schematized in FIG. 1. The band near 950 $cm^{-1}$ in FIG. 2 is likely a result of Si—O stretching.

The $^1$HNMR spectrum of ASAS (FIG. 3) shows different chemical shifts (-δ; ppm) at 0.95 and 3.75 (broad, aliphatic protons) corresponding to $CH_3$ and $CH_2$ groups attached to the Si—O group. The intensity of peaks at 1.2 (S—$CH_2$, aliphatic protons), and 7.26 (S, aromatic protons) elucidate the hydrophobicity of ASAS and confirms that this molecule has aliphatic lengths more than aromatics. The peak at 3.8 ppm presumably evinces a CH group attached to the succinimide group.

Example 9

Wetting Characteristics of Super-hydrophobic Sand and Sponge

Figure 6A:
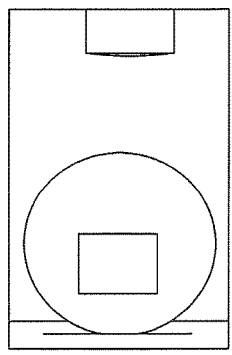
FIG. 6A: Contact angle of water and hydrophobic silica/ASAS films prepared by method 3 having ASAS content 40 wt. % at 25° C.
Figure 6B:
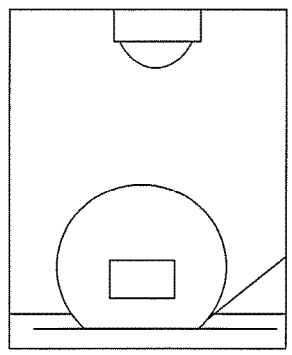
FIG. 6B: Contact angle of water and hydrophobic silica/ASAS films prepared by method 3 having ASAS content 10 wt. % at 25° C.
Figure 6C:
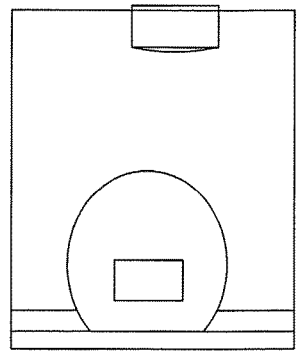
FIG. 6C: Contact angle of water and hydrophobic silica/ASAS films prepared by method 3 having ASAS content 5 wt. % at 25° C.

The wetting of the hydrophobic silica/ASAS nanoparticle composition was evaluated by applying a thin film of the composition with a thickness of 2 μm on bare (uncoated) glass panels to make coated glass surfaces and measuring the contact angle of water with the coated glass surfaces. The contact angle of water with uncoated glass surface was 45° and the contact angles of the water with the glass coated with the hydrophobic silica nanoparticles are listed in Table 1. Hydrophobic silica/ASAS nanoparticles were prepared according to Method 3 with varying amounts of ASAS ranging from 40 to 1 wt. %, and applied on the glass surface to determine their contact angles, reported in Table 1 and illustrated in FIGS. 6A-6C.

TABLE 1

Contact angle of water with hydrophobic silica/ASAS nanoparticle films at 25° C.

| ASAS wt. % content in sample composition | Contact angle (degrees) |
| --- | --- |
| 40 | 170 |
| 20 | 160 |
| 10 | 155 |
| 5 | 140 |

Highest contact angles were seen for glass coated with silica/ASAS nanoparticles formed in the presence of 40 wt. % of ASAS (Table 1 and FIGS. 6A-6C), which achieved a contact angle of 170°.

The super-hydrophobicity of the sand mixtures, produced from blending treated sand (sand coated with hydrophobic silica/ASAS nanoparticles) with untreated sand, was evaluated by measuring the ability for water to pass through such mixtures, as described in the experimental section. The shape of water on the sand and PU sponges treated with the composition prepared using Method 3 demonstrated hydrophobicity imparted by the present hydrophobic nanoparticle compositions (hydrophobic silica/ASAS nanoparticles).

Example 10

Efficiency of Hydrophobic Sand and Hydrophobic PU Sponge as Oil Spill Collectors The hydrophobicity of hydrophobic sand and hydrophobic PU sponge treated with the present compositions them suitable candidates as oil spill collectors. Different ratios of treated hydrophobic sand or hydrophobic PU sponges were applied to crude oil (ranging from volumetric ratios of 1:1 to 1:10 relative to the crude oil volume) and evaluated for oil collection efficiency. The efficiency results of the hydrophobic sand and hydrophobic PU sponges on the collection of Arabic medium and heavy crude oils are presented in Table 2.

TABLE 2

Efficiency of Hydrophobic sand Coated with the Nanoparticles Composition Prepared using Method 3 for collection of oil on water surfaces.

| Ratio nanoparticle composition:sand (1:2) | | | Ratio nanoparticle composition:sand (1:4) | | | Ratio nanoparticle composition:sand (1:8) | | |
| --- | --- | --- | --- | --- | --- | --- | --- | --- |
| Sand treated with composition:Crude oil | | | Sand treated with composition:Crude oil | | | Sand treated with composition:Crude oil | | |
| 1:1 | 1:2 | 1:10 | 1:1 | 1:2 | 1:10 | 1:1 | 1:2 | 1:10 |
| | | | | Efficiency (CE%) | | | | |
| 92 | 90 | 80.5 | 89 | 85 | 58 | 78 | 55 | 28 |

The efficiency of the hydrophobic sand comprising hydrophobic sand treated with hydrophobic (silica/ASAS) nanoparticle composition prepared by method 3 for collection of the oil spills from the water surfaces increased when the composition was increased. The highest efficiency ratio was 1:1, resulting in a removal efficiency of 92%. Moreover, the PU sponge treated with the composition (1:1) achieved 100% of oil spill collections in a few seconds.

It is to be understood that the hydrophobic nanoparticle compositions for crude oil collection is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A hydrophobic nanoparticle composition, comprising:
   silica nanoparticles; and
   an asphaltene succinimide alkoxy silane coating on the silica nanoparticles.

2. The hydrophobic nanoparticle composition according to claim 1, wherein the nanoparticles have a particle size ranging from 20 nm to 10000 μm.

3. A super-hydrophobic sand, comprising:
   sand particles; and
   the hydrophobic nanoparticle composition of claim 1 coating a surface of the sand particles.

4. A method of collecting oil from a water surface, comprising contacting the water surface with the super-hydrophobic sand of claim 3.

5. A super-hydrophobic polyurethane sponge, comprising:
   a polyurethane sponge; and
   the hydrophobic nanoparticle composition of claim 1 coating a surface of the sponge.

6. A method of collecting oil from a water surface, comprising contacting the water surface with the super-hydrophobic polyurethane sponge of claim 5.

7. A method of preparing a hydrophobic nanoparticle composition, comprising:
   mixing a solution including tetraethyl orthosilicate with ASAS.

8. The method of preparing the hydrophobic nanoparticle composition of claim 7, wherein the tetraethyl orthosilicate solution comprises n-hexane.

9. The method of preparing the hydrophobic nanoparticle composition of claim 7, wherein the tetraethyl orthosilicate solution comprises a fatty amine of vinyltrimethoxysilane.

10. The method of preparing the hydrophobic nanoparticle composition of claim 9, wherein the fatty amine is selected from a group consisting of stearic, hexadecanoic, tetradecanoic, oleic, linoleic and linolenic amines.

11. A hydrophobic nanoparticle composition formed according to claim 7.

12. A method of modifying sand, comprising:
    combining sand with the hydrophobic nanoparticle composition of claim 11.

13. Hydrophobic sand, wherein the hydrophobic sand is produced by modifying sand according to claim 12.

14. A method of modifying a polyurethane sponge, comprising:
    dispersing the hydrophobic nanoparticle composition of claim 11 in a solution comprising polydimethylsiloxane (PDMS);
    immersing the sponge in the hydrophobic nanoparticle composition in PDMS solution to provide a coated sponge;
    removing the coated sponge from the hydrophobic nanoparticle composition in PDMS solution; and allowing the coated sponge to dry.

15. A hydrophobic nanoparticle composition, comprising:
    silica nanoparticles; and
    an asphaltene succinimide alkoxy silane coating on the silica nanoparticles, the silica nanoparticles with the asphaltene succinimide alkoxy coating having a particle size ranging from 20 nm to 10000 μm.

* * * * *